United States Patent [19]

Abreu

[11] Patent Number: 5,076,062
[45] Date of Patent: Dec. 31, 1991

[54] GAS-COOLED FLAMEHOLDER ASSEMBLY

[75] Inventor: Mario E. Abreu, South Peabody, Mass.

[73] Assignee: General Electric Company, Lynn, Mass.

[21] Appl. No.: 117,183

[22] Filed: Nov. 5, 1987

[51] Int. Cl.[5] .............................................. F02G 1/00
[52] U.S. Cl. .......................................... 60/749; 60/261
[58] Field of Search .................... 60/261, 749, 39.83, 60/226.1, 262

[56] References Cited

U.S. PATENT DOCUMENTS

| | | |
|---|---|---|
| 2,763,427 | 9/1956 | Lindsey . |
| 2,799,991 | 7/1957 | Conrad . |
| 2,918,794 | 12/1959 | Hurd . |
| 2,961,150 | 11/1960 | Pirtle . |
| 3,043,101 | 7/1962 | Lefebvre et al. . |
| 3,062,006 | 11/1962 | Egbert et al. . |
| 3,540,216 | 11/1970 | Quillevere et al. ............ 60/261 |
| 3,595,024 | 7/1971 | Kohler et al. .................. 60/261 |
| 3,701,255 | 10/1972 | Markowski . |
| 3,750,402 | 8/1973 | Vdoviak et al. ................ 60/261 |
| 3,765,178 | 10/1973 | Hufnagel et al. ............... 60/261 |
| 3,800,527 | 4/1974 | Marshall et al. . |
| 3,877,863 | 4/1975 | Penny . |
| 3,899,883 | 8/1975 | Stakic et al. . |
| 3,931,707 | 1/1976 | Vdoviak . |
| 4,064,691 | 12/1977 | Nash . |
| 4,315,401 | 2/1982 | Beal et al. ..................... 60/262 |
| 4,445,339 | 5/1984 | Davis, Jr. et al. .............. 60/749 |
| 4,490,973 | 1/1985 | Kinsey .......................... 60/261 |

FOREIGN PATENT DOCUMENTS 1146227 11/1957 France .

OTHER PUBLICATIONS

Irwin E. Treager, *Aircraft Gas Turbine Engine Technology*, 1979, pp. 170-172.

Primary Examiner—Richard A. Bertsch
Assistant Examiner—T. S. Thorpe
Attorney, Agent, or Firm—Francis L. Conte; Nathan D. Herkamp; Jerome C. Squillaro

[57] ABSTRACT

The uprating of existing jet engines increases the operating temperatures within the engines and also increases the tendency for flashback in some afterburner type engines. Afterburner type engines include a pilot fuel delivery pipe which is included between inner and outer annular members of a flameholder. Downstream from the pilot, partitions direct an ignited fuel/air mixture into the afterburner chamber. The afterburner flame is downstream from the flameholder, but under conditions of increased temperature the afterburner flame will tend to migrate upstream toward the flameholder. To avoid this tendency, the flameholder includes means for discharging gas which cools the flameholder metal itself while also decreasing the downstream air temperature, thereby decreasing the potential for flashback. In one embodiment, fuel and oxygen depleted turbine discharge gas are used to further decrease the tendency toward flashback.

20 Claims, 4 Drawing Sheets

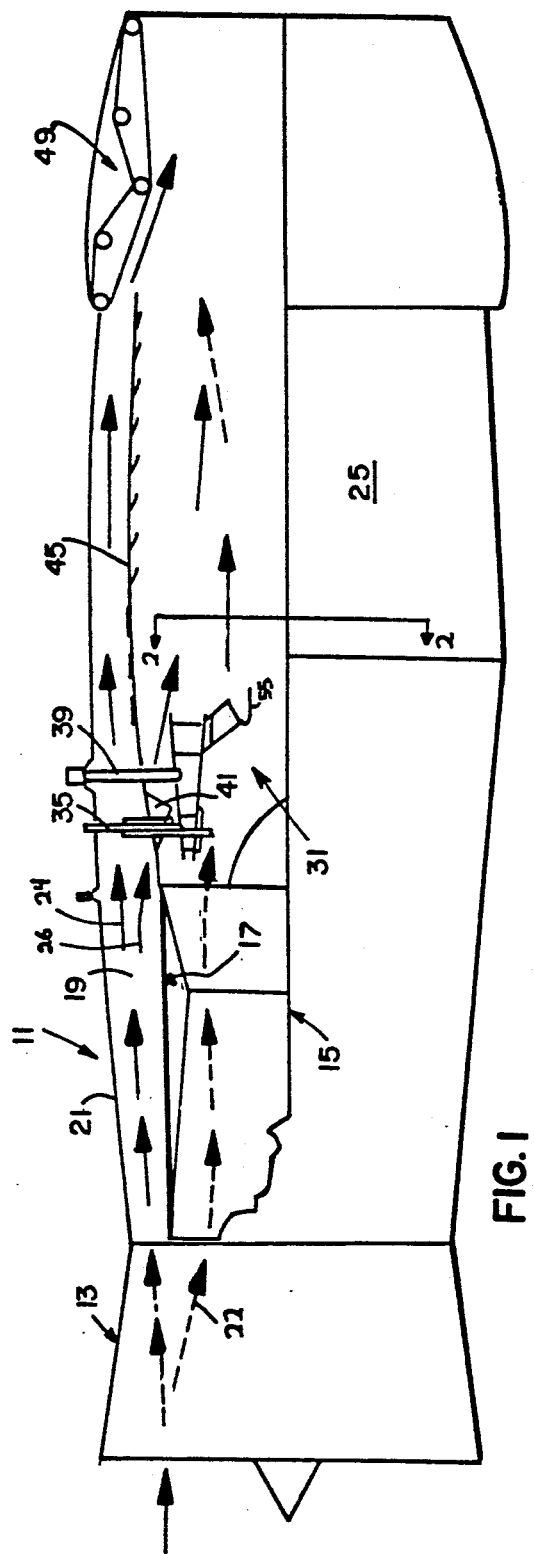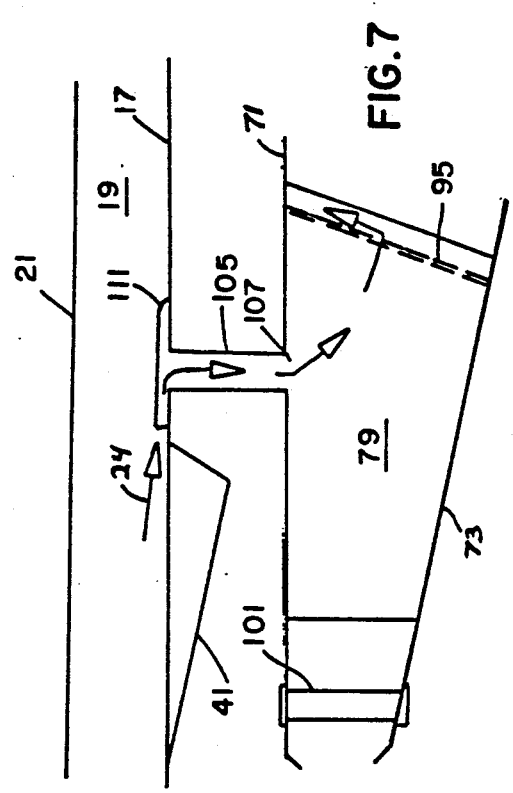

GAS-COOLED FLAMEHOLDER ASSEMBLY

CROSS REFERENCE TO RELATED APPLICATION

This application is related to copending application Ser. No. 117,187 filed concurrently herewith and assigned to the same assignee as this invention. This invention relates to a cooled flameholder assembly.

BACKGROUND OF THE INVENTION

This invention relates to gas turbine, or jet, engines, and, in particular, to engines which include afterburners downstream of a core engine with means for adding fuel to exhaust flow for augmenting thrust.

A bypass jet engine includes a low pressure compressor (LPC) for pressurizing inlet air to the engine; a core engine for producing thrust and also for driving the LPC; and, further, may include an afterburner in which fuel is added to the core engine exhaust, which is then ignited to provide thrust augmentation. The bypass engine is so called because it includes an annular outer casing which is substantially concentrically mounted about the core engine casing to form an annular bypass duct therebetween. The discharge air from the LPC is divided between the bypass duct and the core engine.

In general, engine lines mature and as uprated versions of existing engines are derived, one of the design methods to obtain increased engine output has been to increase turbine inlet temperature with a consequent increase in the inlet temperature to the afterburner. The flashback margin of the fuel/air mixture scrubbing the afterburner hardware is thereby proportionately reduced. Flashback is the movement of the flame front upstream of its design position against the direction of the main gas flow and toward the flameholder and the fuel injection source. Flashback margin is the difference in actual temperature of the exhaust gases and the temperature thereof which would cause flashback.

If the turbine exhaust temperatures increase sufficiently, then the afterburner flame front would move upstream in the afterburner combustion chamber toward the flameholder. The flameholder would then increase in temperature due to the radiation/convective heat loads, which could result in reduced flameholder design life.

Accordingly, it is an object of the present invention to provide an improved flameholder.

Another object of the invention is to provide means for cooling the flameholder.

Another object of the invention is to provide means for increasing flashback margin in an afterburner.

SUMMARY OF THE INVENTION

The invention comprises an improved flameholder assembly having means for cooling an aft facing surface thereof. Disclosed are structures for channeling core engine discharge gases or bypass duct air for cooling the aft surface.

BRIEF DESCRIPTION OF THE DRAWINGS

The novel features believed characteristic of the invention are set forth in the appended claims. The invention itself, in accordance with a preferred exemplary embodiment, together with further objects and advantages thereof is more particularly described in the following detailed description taken in conjunction with the accompanying drawings in which:

FIG. 1 is a schematic sectional view of a bypass jet engine including an afterburner having a flameholder assembly in accordance with one embodiment of the present invention.

FIG. 7 is a schematic of a portion of a flameholder assembly similar to FIG. 3 showing another embodiment of the invention.

DETAILED DESCRIPTION OF THE INVENTION

Figure 2:
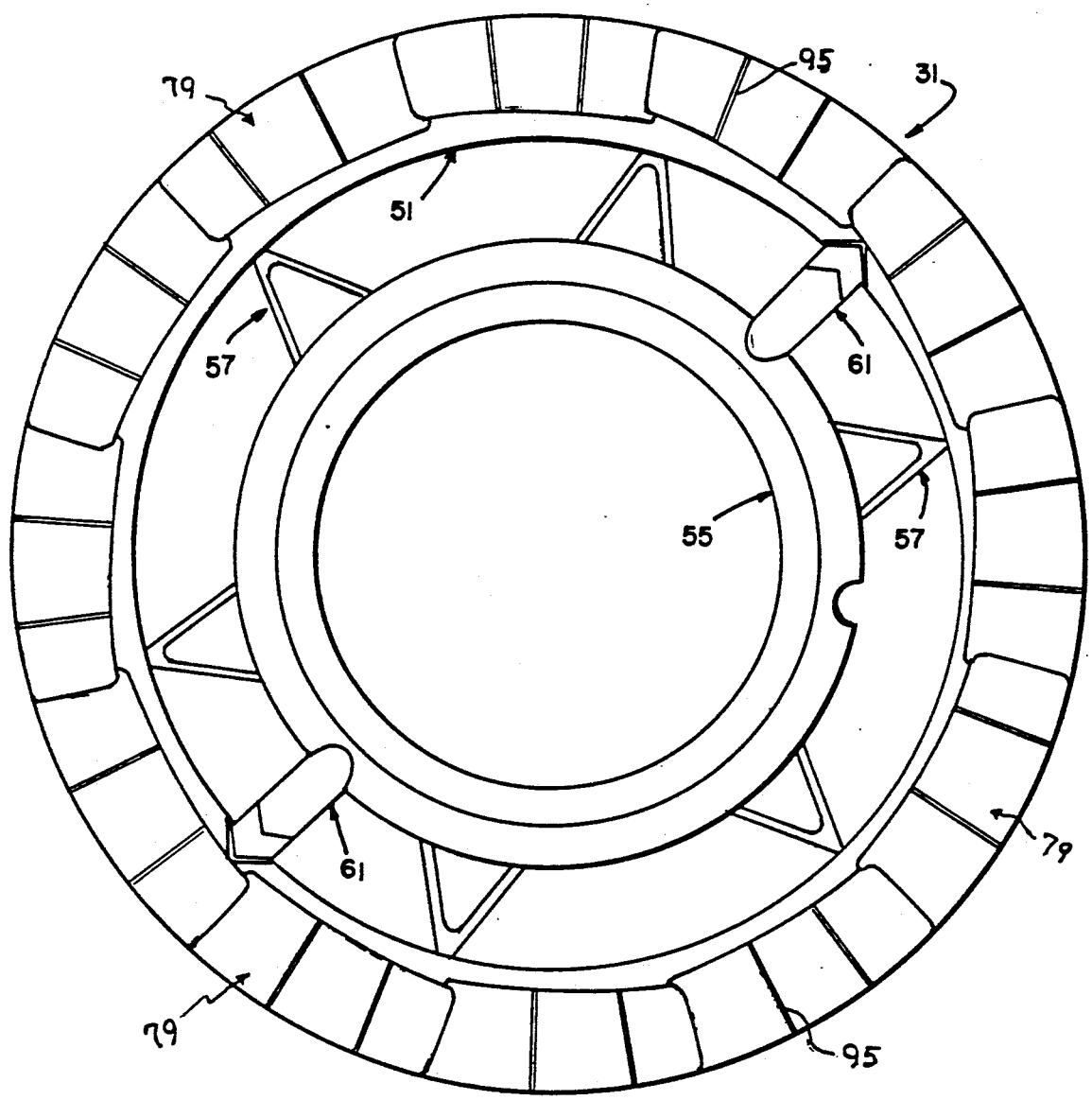
FIG. 2 is an upstream facing end view of the flameholder assembly taken along line 2—2 of FIG. 1.

FIG. 1 shows an exemplary, gas turbine engine 11 of the type which may be considered a bypass jet engine. The engine 11 includes a low pressure compressor (LPC) 13, which is located at the air inlet end of the engine 11. The LPC 13 is followed, with respect to the direction of the airflow, by a core engine 15, which includes a high pressure compressor, a combustor and high pressure and low pressure turbines (not shown). The core engine 15 is surrounded by an annular inner casing 17. An annular bypass duct 19 is defined in part by the casing 17 and an annular outer casing 21, which is substantially concentric and spaced from the inner casing 17. The dashed flow arrows 22 indicate that portion of the LPC 13 discharge air which is sent through the core engine 15, and the solid line arrows 24 indicate the other portion of the LPC 13 discharge air which is channeled through the bypass duct 19.

Downstream from the core engine 15, in the direction of airflow, is an afterburner 25. A flameholder assembly 31, in accordance with one embodiment of the present invention, is positioned in an inlet of the afterburner 25. Fuel is introduced into the afterburner 25 through a plurality (only one shown) of fuel delivery pipes 35. The fuel is mixed with a portion 26 of the bypass duct airflow 24 and then ignited by at least one igniter 39 to provide thrust augmentation in the engine 11. The air portion 26 from the bypass duct 19 is added to the core engine 15 exhaust gas flow through an annular mixer device 41, which is well known in the aircraft engine technology. The afterburner 25 further includes an inner combustor liner 45 and a variable area exhaust nozzle 49. The foregoing general description is given to acquaint the reader with a general description of the environment in which the present invention operates and should not be taken as limiting with respect to the description of the invention itself.

FIG. 2 illustrates an upstream facing end view of the flameholder assembly 31. The flameholder assembly 31 includes a radially outer flameholder 51 and a radially inner flameholder 55. The outer flameholder 51 is in the form of a plurality of bluff bodies, and the inner flameholder 55 is in the form of an annular V-shaped gutter ring. The inner flameholder 55 is supported from the outer flameholder 51 by a plurality of circumferentially-spaced support links 57. Although it is not specifically shown in any of the drawings, the outer flameholder 51, which, in turn, supports the inner flameholder 55, is itself supported from the outer casing 21 by support links in a manner familiar to aircraft engine builders. The outer flameholder 51 communicates with the inner flameholder 55 by at least one, with two being used in the embodiment illustrated, crossfire gutter 61, which causes a flame initially appearing on the downstream surface of the outer flameholder 51 to propagate radially inwardly toward the inner flameholder 55.

Figure 3:
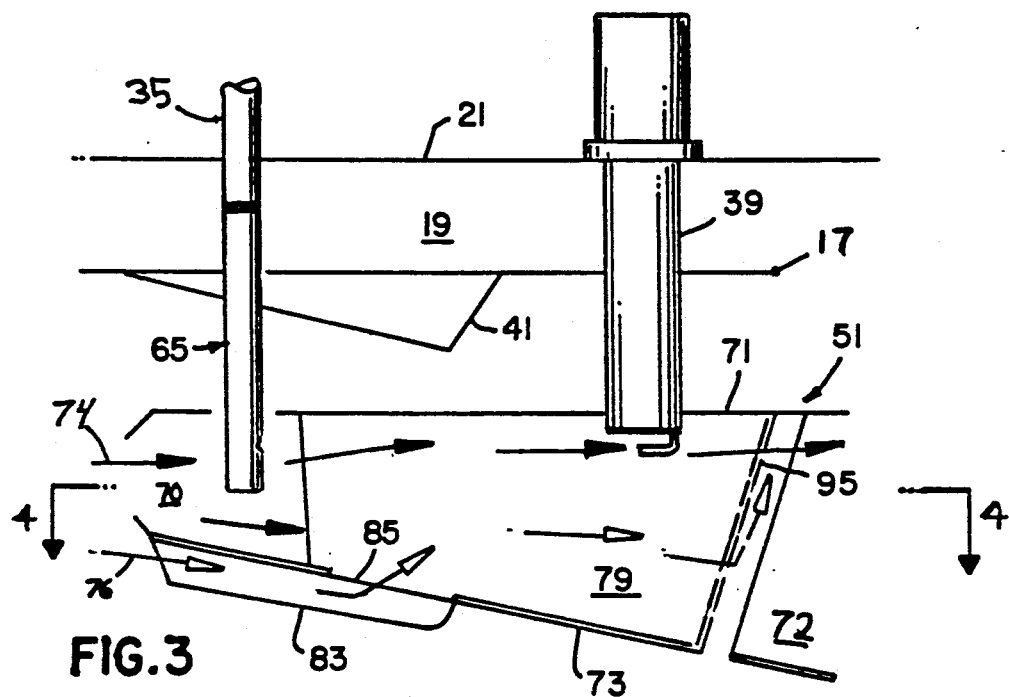
FIG. 3 is an enlarged schematic view of a portion of a flameholder assembly in accordance with one embodiment of the present invention.

FIG. 3 shows a schematic sectional view of the outer flameholder 51 and adjacent structures without the attached inner flameholder 55 or crossfire gutters 61. Further, in an effort to simplify the drawing, a single schematic fuel spraybar 65 extending from the fuel pipe 35 is shown as entering and discharging fuel into the outer flameholder 51. Referring back to FIG. 1, the fuel delivery pipe 35 is actually connected to a plurality of radially inwardly extending spraybars which include both main fuel spraybars and pilot fuel spraybars. The main fuel spraybars inject fuel in the axially downstream direction, from points radially inwardly and outwardly of the outer flameholder 51 and, in one example, may include as many as twenty-four pipes, whereas there may be half as many pilot fuel spraybars. Other numbered parts of the outer flameholder 51 and adjacent structures are as previously described.

Further, the outer flameholder 51 includes a radially outer annular member 71 and a radially inner annular member 73 defining an inlet 70 therebetween at an upstream end and an outlet 72 at a downstream end. These two members may be joined together at the inlet end 70 of the outer flameholder 51 by a plurality of rounded fasteners or pegs 101, as is shown in FIG. 7. In addition, extending between the inner and outer members 71, 73 is a plurality of hollow, airfoil-shaped partitions 79. The solid arrowheads 74 indicate a first portion of core engine, or turbine combustion discharge gas which flows around the partitions 79, as will be described in conjunction with the description of FIG. 4.

The inner member 73 of the outer flameholder 51 has an upstream facing scoop 83 fastened to it. In the preferred embodiment, there is a plurality of such scoops 83 fastened to the radially inner surface of the inner member 73 with holes 85 formed through the inner member 73 which communicate with at least some of the interiors of the partitions 79. The flow arrows 76, having open heads, indicate the flow of a second portion of the turbine discharge gas into the interiors of the partitions 79. In a preferred embodiment, there may be one scoop 83 for directing gas into a corresponding one partition 79 through a corresponding one hole 85 formed through the inner member 73.

It is important to note at this point that the gas which is directed through each partition 79 is fuel- and oxygen-depleted turbine discharge gas, i.e. most, if not all, of the fuel and oxygen therein has completed combustion. As will be described below with respect to an alternate embodiment, the gas may be alternatively bypass air but, in either case, no fuel is added to the gas in the partitions 79. Fuel is added, through the spraybars 65, to the gas which flows around the partitions 79. The fuel-depleted gas is indicated in FIGS. 3 and 4 by means of the open arrowheads 76, and the gas to which fuel is added is indicated by means of the solid arrowheads 74.

Figure 4:
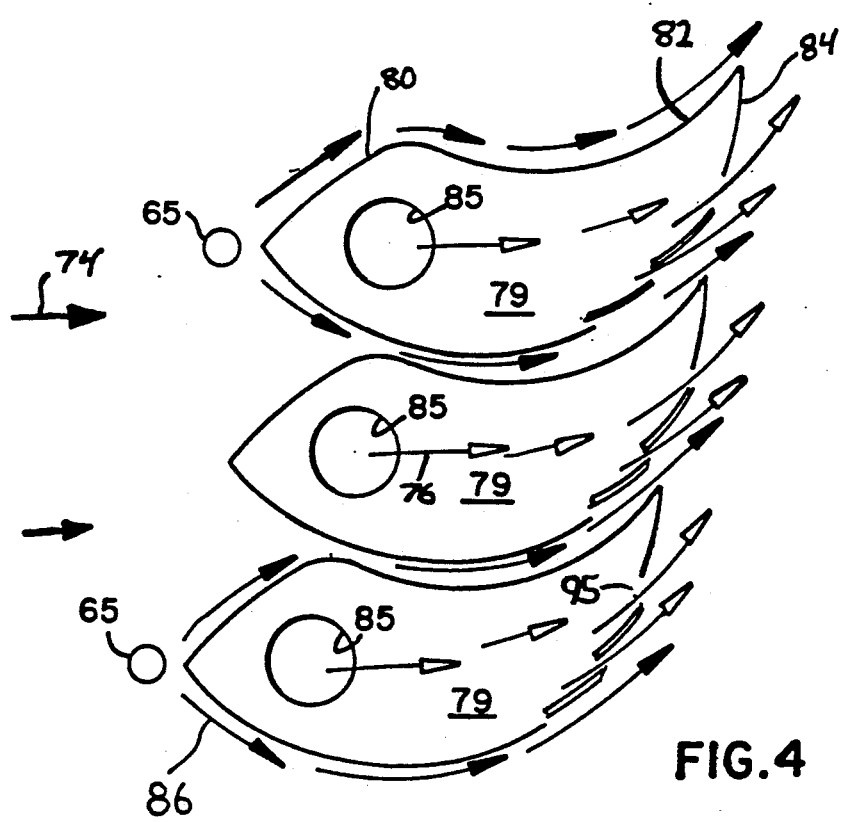
FIG. 4 is a plan view of several partitions taken at line 4—4 of FIG. 3.

With reference to FIG. 4, which is a plan view taken along line 4—4 of FIG. 3, there is shown a plurality of circumferentially-spaced partitions 79 and spraybars 65, with one spraybar 65 associated with each pair of adjacent partitions 79 in this exemplary embodiment. The partitions 79 each include a leading edge portion 80 and a trailing edge portion 82. The partitions 79 are shaped and sized in accordance with the requirements of fuel and gas mixing within the outer flameholder 51 so that the fuel/air mixture is correct and further that the flame occurs on the downstream side, or aft surface, 84 of the trailing edge portion 82 of the outer flameholder 51 rather than at the point where the igniter 39 is located. The partitions 79 also impart a swirl or turning effect on the fuel and turbine discharge gas, collectively referred to as the fuel/air mixture, to enhance mixing thereof. Also shown in FIG. 4 are the holes 85, formed through the inner member 73 under the leading edge portion 80 of the partition 79, which admit gas into the interior of the partitions 79.

Figure 5:
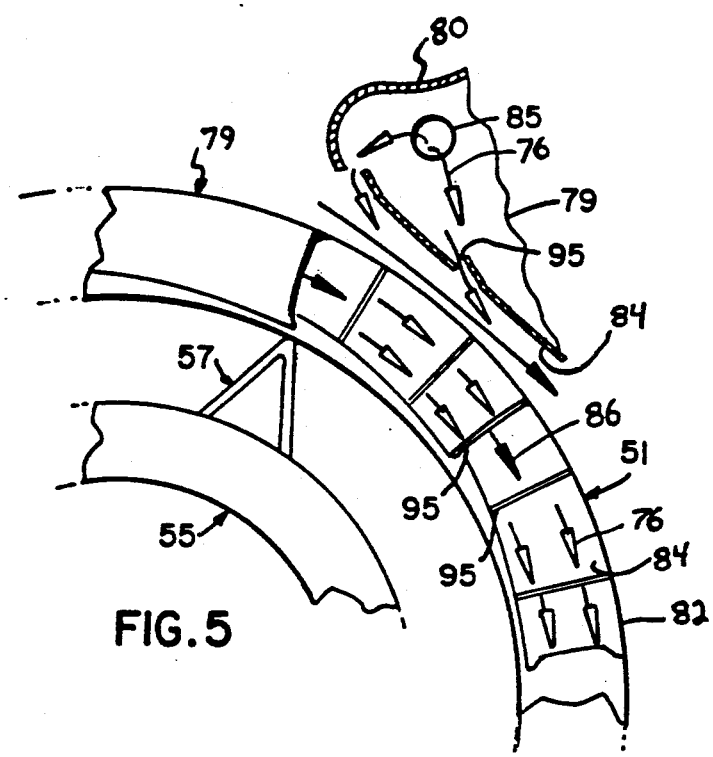
FIG. 5 shows a section of the flameholder assembly of FIG. 1 and a cutaway showing of a partition therein.

FIGS. 3, 4 and 5 should be studied together with reference to the present invention. Like numerals are used to identify like members which were previously explained. Also, the reader is reminded that the open arrowheads 76 identify fuel-depleted gas, whereas the solid arrowheads 86 indicate carbureted gas, i.e. gas 74 which is mixed with fuel.

FIG. 5 shows a partial section of the flameholder assembly 31 with the leading edge portion 80 of partition 79 additionally shown as rotated toward the viewer ninety degrees in order to show flow lines as well as further details of construction with respect to the partition 79. The view of the flameholder assembly 31 is of the aft, or downstream, face 84 thereof. FIG. 5 shows a preferred embodiment of the outer flameholder 51 in which the aft face 84 of the partition 79 is formed with film-cooling discharge louvers 95. The louvers 95 discharge fuel-depleted gas, as indicated by the open arrowheads 76. The film cooling of the aft face 84 of the partitions 79 lowers metal temperatures at the aft face 84. It is further important to realize that while fuel-depleted film-cooling gas 76 is being discharged from louvers 95, carbureted or fuel-enriched gas 86 is being discharged from between the partitions 79 so that, in accordance with the flow arrow diagram, it is clear that the film-cooling gas 76 will be immediately adjacent to the aft face 84 of each partition 79, whereas the fuel-rich gas 86 will be discharged in a stream or layer which is beyond the film-cooling gas 76 relative to the aft face 84 of the partition 79. Thus, the film-cooling gas 76 is interposed between the partition 79 or partition aft surface 84 and the fuel/air mixture 86 channeled between the partitions 79. It should also be realized that the carbureted mixture 86 has been ignited by the igniter 39 and, thus, creates a flame front downstream of the aft face 84 having a higher temperature than the relatively cool gas 76 discharged through the louvers 95.

Moreover, specifically at the onset of any flashback, when the carbureted gas 86 is starting to burn and is thus very hot relative to design metal temperatures, film-cooling gas 76 scrubbing the aft face 84 is now thousands of degrees cooler than gas 86, thus providing an effective cooling film during actual sustained or sporadic flashback conditions.

In addition to providing film cooling of the aft face 84, the gases 76 also provide a barrier film which keeps the flame front from contacting the aft face 84. Using previously burned gases 76 is also advantageous because they are no longer combustible themselves, which provides a more effective film-cooling barrier, for example.

Figure 6:
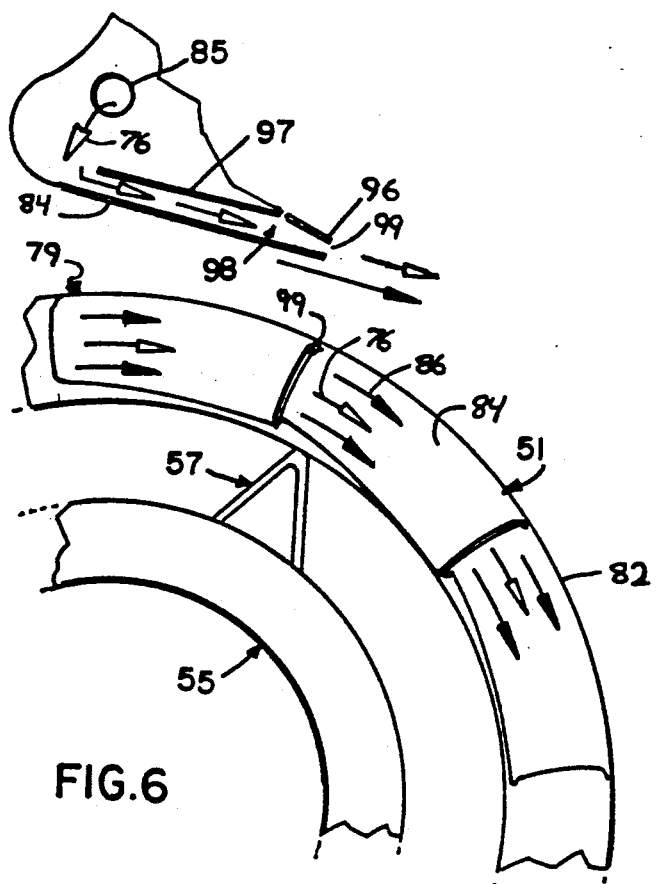
FIG. 6 shows a section of a flameholder assembly and a cutaway showing of a partition therein in accordance with an alternate embodiment of the invention.

Referring to FIG. 6, which shows an alternate embodiment of the invention in which the aft face 84 of the partition 79 is cooled by convection, within the partition 79 a wall 97 is disposed approximately parallel to the aft surface 84 of the partition 79 defining a flowpath 98 adjacent to the aft surface 84. In this embodiment, the flow of uncarbureted or fuel-depleted gas 76 is across the interior surface of the aft face 84 of the partition 79, and the gas 76 is discharged from a trailing edge 96 of the partition 79 through a discharge opening 99. While both embodiments are effective to provide cooling of the aft face 84 of the partition 79, it is pointed out that where the cooling gas 76 to the interior of the partition 79 is turbine discharge gas 76, such gas 76 is not only fuel-depleted but it is also oxygen-depleted. In accordance with one of the objectives of this invention, the sweeping of the aft surface 84 of the partition 79 with oxygen- and fuel-depleted gas 76 will further diminish the chance occurrence of flame on the aft face 84 of the outer flameholder 51.

Finally, FIG. 7 shows another embodiment of the invention in schematic form. FIG. 7 is intended to be similar to FIG. 3, except that the spraybar 65 has been removed for the sake of clarity. The previously-mentioned rounded fastener or peg 101 is shown for joining the upstream ends of the outer and inner flameholder members 71, 73.

In this embodiment, a portion of bypass air 24 is taken from the bypass duct 19 and channeled to the interior of the partition 79 through a tube 105 and opening 107 in the outer member 71. The opening 107 is functionally equivalent to the opening 85 in the preferred embodiment. There is a plurality of scoops 111 which are fastened to the inner liner 17, which forms the inner boundary of the bypass duct 19. The advantage of this embodiment is that the bypass air 24 is much cooler than the turbine discharge gas 74.

While there have been described herein what are considered to be preferred embodiments of the invention, other modifications may occur to those of ordinary skill in the art. It is intended to cover in the appended claims all such modifications which fall within the true spirit and scope of the claims.

I claim:

1. A gas turbine engine comprising:
   an air compressor;
   an outer casing extending downstream from said compressor;
   a core engine including a turbine joined to said compressor, said core engine being disposed in said casing and defining therewith a bypass duct for channeling a first portion of air from said compressor around said core engine and for receiving a second portion of air from said compressor for mixing with fuel and generating combustion gases for driving said turbine and said compressor, said gases being dischargeable from an aft end of said core engine;
   an afterburner disposed downstream of said core engine and including:
      a combustor liner,
      a flameholder assembly disposed upstream of said liner and downstream of said core engine, said assembly including a flameholder, and
      means for cooling said flameholder by channeling only noncombustible gas to said flameholder, said noncombustible gas being a first portion of said combustion gases.

2. A gas turbine engine according to claim 1 wherein said flameholder assembly further comprises means for introducing fuel at an upstream end of said flameholder, and said flameholder cooling means is effective for cooling an aft facing surface of said flameholder.

3. A gas turbine engine according to claim 4 wherein said flameholder comprises radially-spaced annular outer and inner members defining an inlet therebetween at an upstream end and an outlet therebetween at a downstream end, said outlet including a flameholder member having said aft facing surface coolable by said cooling means, said inlet being in flow communication with said core engine for receiving said first portion of combustion gases therefrom.

4. A gas turbine engine according to claim 3 wherein said cooling means includes an aperture in said flameholder inner member for receiving a second portion of said combustion gases from said core engine, and means for channeling said second portion of gases to said flameholder member.

5. A gas turbine engine according to claim 3 wherein said flameholder member comprises a plurality of circumferentially-spaced hollow members extending between said inner and outer members and said cooling means includes a plurality of apertures in said inner member for receiving a second portion of said combustion gases from said core engine, each of said apertures being disposed under a respective one of said hollow members for providing combustion gas therein for cooling an aft surface of said hollow member.

6. A gas turbine engine according to claim 5 wherein each of said hollow members is airfoil-shaped and has an upstream leading edge portion and a downstream trailing edge portion, said trailing edge portion having an outlet aperture for discharging gases from within said hollow member.

7. A gas turbine engine according to claim 6 wherein said trailing edge portion of said hollow member comprises said aft facing surface and said outlet aperture comprises a radially extending slot for providing film cooling of said aft facing surface.

8. A gas turbine engine according to claim 7 wherein said flameholder inner member includes upstream facing scoops disposed over said apertures therein for channeling said combustion gas to said apertures.

9. A flameholder assembly for a jet engine, the assembly having an upstream side and a downstream side with respect to combustion gases flowable through the engine; the assembly comprising:
   an annular outer member and an annular inner member having a plurality of radial hollow partitions positioned therebetween;
   means for introducing fuel at said upstream side of said flameholder assembly and for mixing said fuel with said combustion gases for generating a combustible fuel and gas mixture flowable downstream over said partitions; and
   means for channeling a noncombustible cooling gas into the interior of at least some of the partitions and then channeling said noncombustible gas from said interior to an exterior of said partitions between adjacent partitions to form a noncombustible gas boundary between a trailing edge portion of said partitions and said fuel and gas mixture flowable thereover for cooling said partitions.

10. The flameholder assembly recited in claim 7 wherein the jet engine further includes an annular bypass air duct and the means for channeling gas includes:
   at least one scoop positioned in the annular bypass duct; and,
   at least one opening through the outer member for communicating the at least one scoop with the interior of at least one of the partitions.

11. The flameholder assembly recited in claim 7 wherein the means for channeling gas includes:
   at least one scoop positioned on the radially inner surface of the inner member; and,
   at least one opening through the inner member for communicating the at least one scoop with the interior of at least one of the partitions.

12. The flameholder assembly in accordance with claim 11 wherein the scoop includes an open end facing in the upstream direction.

13. The flameholder assembly in accordance with claim 7 wherein at least one of the partitions includes at least one louver on the downstream face of the partition, the louver passing cooling gas from the interior of the partition to the downstream face.

14. The flameholder assembly in accordance with claim 7 wherein at least one of the partitions includes at least one interior wall spaced from the downstream side of the partition defining a flowpath adjacent to the downstream side of the partition; and,
   at least one discharge opening on the downstream side of the partition for exhausting gas from the partition after cooling the downstream side of the partition.

15. An improved flameholder assembly for a jet engine of the type having a low pressure compressor, a core engine and an afterburner; an annular bypass duct between the core engine and a surrounding engine casing and wherein the flameholder assembly is positionable in the afterburner in the core engine discharge path; and, wherein the improved flameholder assembly comprises:
   concentric, annular first and second members having a plurality of radial hollow partitions extending therebetween;
   a plurality of scoops, each of the scoops being positioned in flow communication with at least one opening through said first member; a respective partition communicating with a respective opening;
   means for introducing fuel at an upstream side of said flameholder assembly and for mixing combustion gases discharged from said core engine with said fuel for generating a combustible fuel and gas mixture flowable downstream over said partitions; and
   means for cooling the partitions by channeling a noncombustible gas from said scoops to said partitions to form a noncombustible gas boundary between a trailing edge portion of said partitions and said fuel and gas mixture flowable thereover.

16. A flameholder assembly according to claim 15 wherein said cooling means comprises at least one louver formed through an aft wall of at least some of the partitions for film cooling an aft surface of the aft wall of the partition.

17. A flameholder assembly according to claim 15 wherein said cooling means comprises an interior wall in each partition spaced from an aft wall and a discharge opening in the trailing edge of the partition whereby said noncombustible cooling gas which is picked up by each scoop and delivered to the interior of the hollow partition is used to cool the aft wall of the partition prior to being discharged from the partition.

18. The flameholder assembly recited in claim 17 wherein the scoops are positionable to receive a flow of turbine combustion discharge gas.

19. The flameholder assembly recited in claim 17 wherein the scoops are positionable to receive a flow of turbine bypass air.

20. The flameholder assembly recited in claim 19 wherein the scoops are positionable in the bypass duct, and wherein the improvement further comprises a plurality of tubes each connecting one of the scoops with a respective partition through an opening in the second member.

* * * * *